Dec. 18, 1951      P. E. PEARSON      2,578,833
MACHINE FOR PACKING SMALL FISH IN CANS
Filed June 7, 1946      6 Sheets-Sheet 1

Inventor
P. E. Pearson.
By Mason, Parks, Miller & Stewart
Attorneys

Dec. 18, 1951 P. E. PEARSON 2,578,833
MACHINE FOR PACKING SMALL FISH IN CANS
Filed June 7, 1946 6 Sheets-Sheet 2

Inventor
P. E. Pearson
By Mason, Porter, Miller & Stewart
Attorneys

Dec. 18, 1951 — P. E. PEARSON — 2,578,833
MACHINE FOR PACKING SMALL FISH IN CANS
Filed June 7, 1946 — 6 Sheets-Sheet 4

Inventor
P. E. Pearson
By Mason, Parker, Miller & Stewart
Attorneys

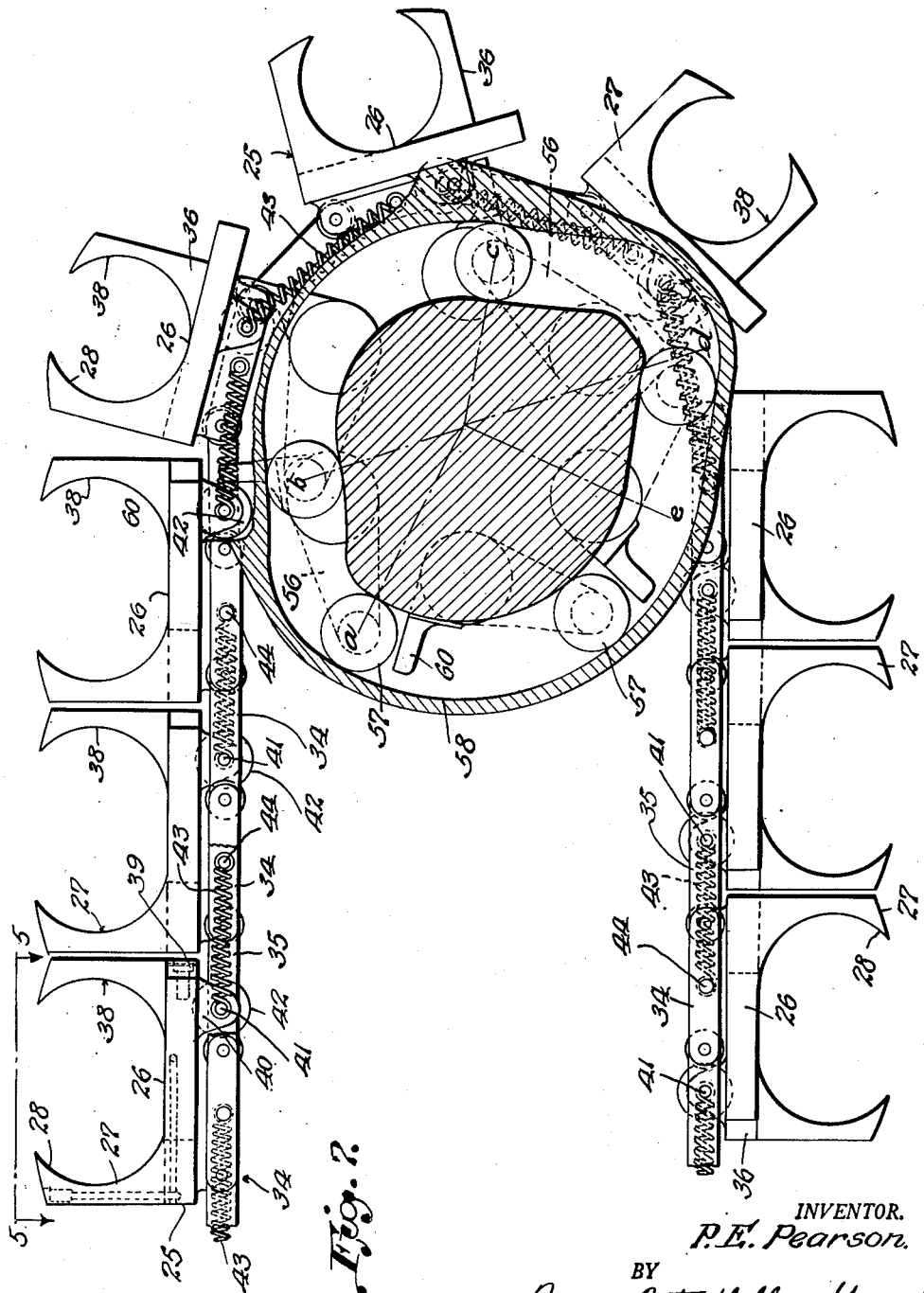

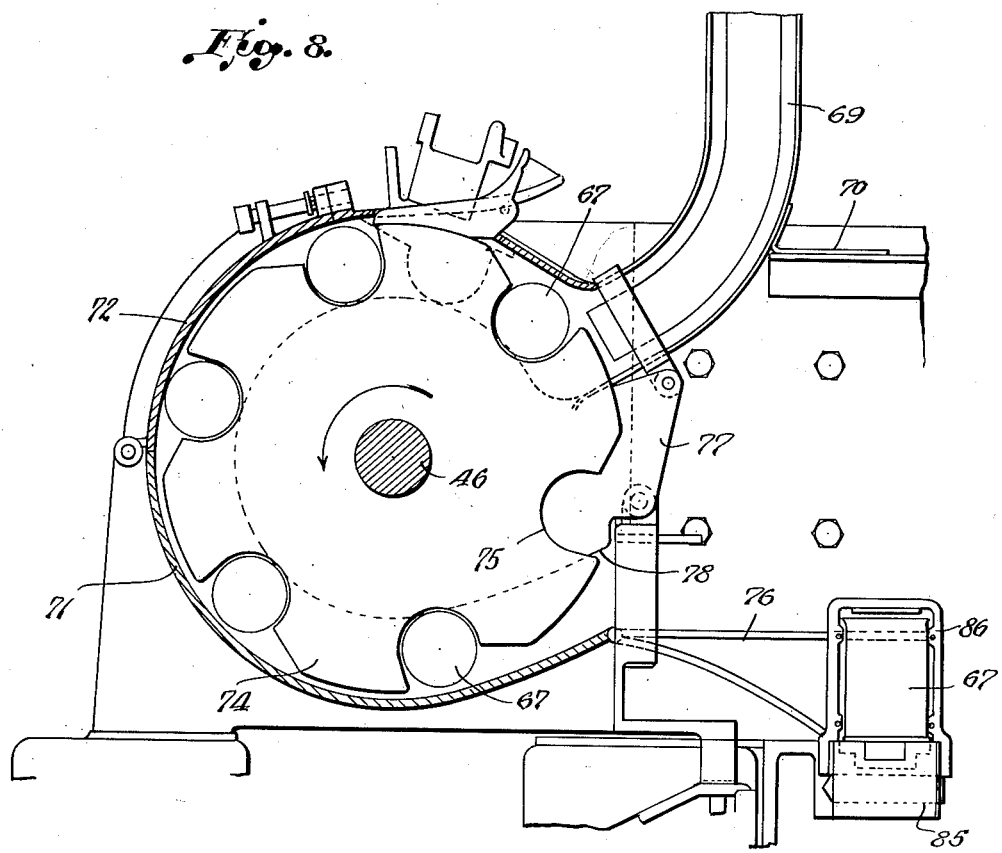

Patented Dec. 18, 1951

2,578,833

UNITED STATES PATENT OFFICE 2,578,833

MACHINE FOR PACKING SMALL FISH IN CANS

Paul E. Pearson, New York, N. Y., assignor to Continental Can Company, Inc., New York, N. Y., a corporation of New York Application June 7, 1946, Serial No. 675,087

7 Claims. (Cl. 226—101)

The following specification relates to improvements in a machine for mechanically packing small fish in cans. It is well known practice to fill round cans with fish and the like by machines which form indiscriminate masses or charges of the fish and it is only such charges that are actually packed into the receptacles. Typical of such machines are those described in the Nicholson Patent No. 1,891,830, and the Dodge Patent No. 1,891,870. Each of these patents takes a charge of the desired size from a hopper and compresses this charge so that it may be inserted into the end of a cylindrical can. In carrying out this procedure no regard is given to the individual pieces of fish and, in fact, means is provided to cut into the chucks of fish as required to segregate the charge of appropriate size for each can.

Machines of the type above outlined are not well adapted for packing small fish such as sardines (pilchards) mackerel and the like. Since such fish are relatively small, the consumer expects to receive them in whole or unbroken form in contradistinction to the steaks or chunks of larger fish such as salmon, tuna or the like. Also it takes a number of small fish to make up a pack or charge for each can. For example from 7 to 10 sardines, or approximately 4 mackerel constitute a normal charge for filling the commonly used cylindrical can. Further, in preparing the individual fish for packing it is the usual practice to trim each fish by cutting off the head and tail portions and also trimming away the under-side of the fish. This results in a piece of irregular form decidedly tapering toward the tail end. As a consequence, the economical packing of a number of such individual tapering pieces of fish requires that they be arranged so that the charge for each can shall contain a substantially equal number of pieces headed in opposite directions. In other words, the fish packed in a single can should have an equal number faced in opposite directions in order to completely fill the can. This is done by arranging the individual fish in alternate positions. It is sometimes feasible, however, to arrange rows of the fish alternately.

Even with such arrangement, it is also necessary in some machines to exercise great care in seeing that the fish at the periphery of the charge are fed into the can head first to avoid damage caused by the possible engagement of the edge of the can with the tail portion of an individual fish followed by a slicing action which causes some of the fish to be diverted outside of the can and thus lost from packing.

It is an object of my invention to provide an improved machine by which small fish may thus be economically packed within containers.

It is a further object of my invention to avoid loss or damage to the individual fish in the packing operation.

A still further object of my invention is to provide suitable means by which the individual small fish may be arranged in advance of the packing operation so that there shall be a most economical and compact filling of the can with a minimum of voids.

Among the objects of my invention is to provide for the convenient transfer of the charges of fish from the point at which they are arranged to the can filling machine.

A still further object of the invention is to compress or compact each charge of the fish during the transfer and prior to the introduction of the fish into the containers.

As illustrating my invention I have shown the preferred form thereof on the accompanying drawings in which:

Fig. 7 is an enlarged vertical longitudinal section of the molding conveyor and associated parts only, taken on the line 7—7 of Fig. 3; and Fig. 8 is a vertical longitudinal section of the can feeding turret taken on the line 8—8 of Fig. 1.

In general, the apparatus consists of a mold filling table and an associated can filling machine at which the molds are reduced to a size conforming to that of the cans to be filled.

I have shown the mold filling table 11 extending for a considerable length and attached to the side of a can filling machine 12. The table 11 is mounted on a stand 13 and includes parallel shelves 14, 14. These shelves are of suitable proportions to permit a number of workers to stand on opposite sides and arrange the individual fish into appropriate charges.

Figure 4:
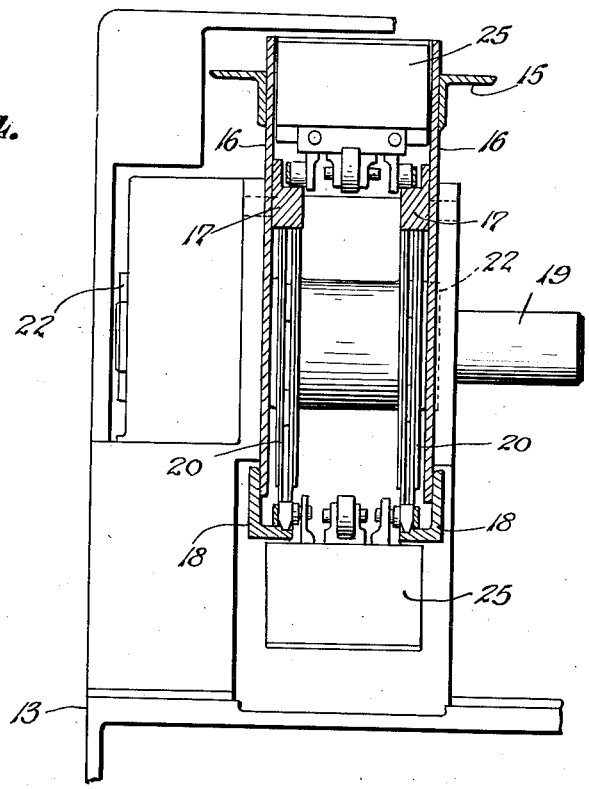
Fig. 4 is an enlarged vertical section of the conveyor end taken on the line 4—4 of Fig. 2.
Figure 5:
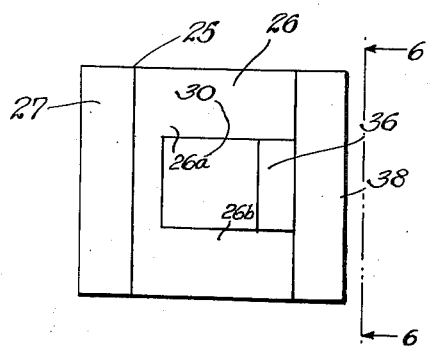
Fig. 5 is a top plan view of one mold unit of the conveyor.

The shelves 14, 14 are mounted on brackets 15 (Fig. 4) outside of side walls 16, 16.

The walls 16, 16 support a pair of upper tracks 17, 17 while a similar pair of tracks 18, 18 is arranged to be supported from the sides 16, 16 along their bottom edges. At the outer end of the table there is a transverse idle shaft 19. This shaft carries a pair of parallelly spaced sprocket wheels 20, 20.

The shaft 19 is carried in journals 22 extending laterally of the table 11 above stand 13.

Figure 2:
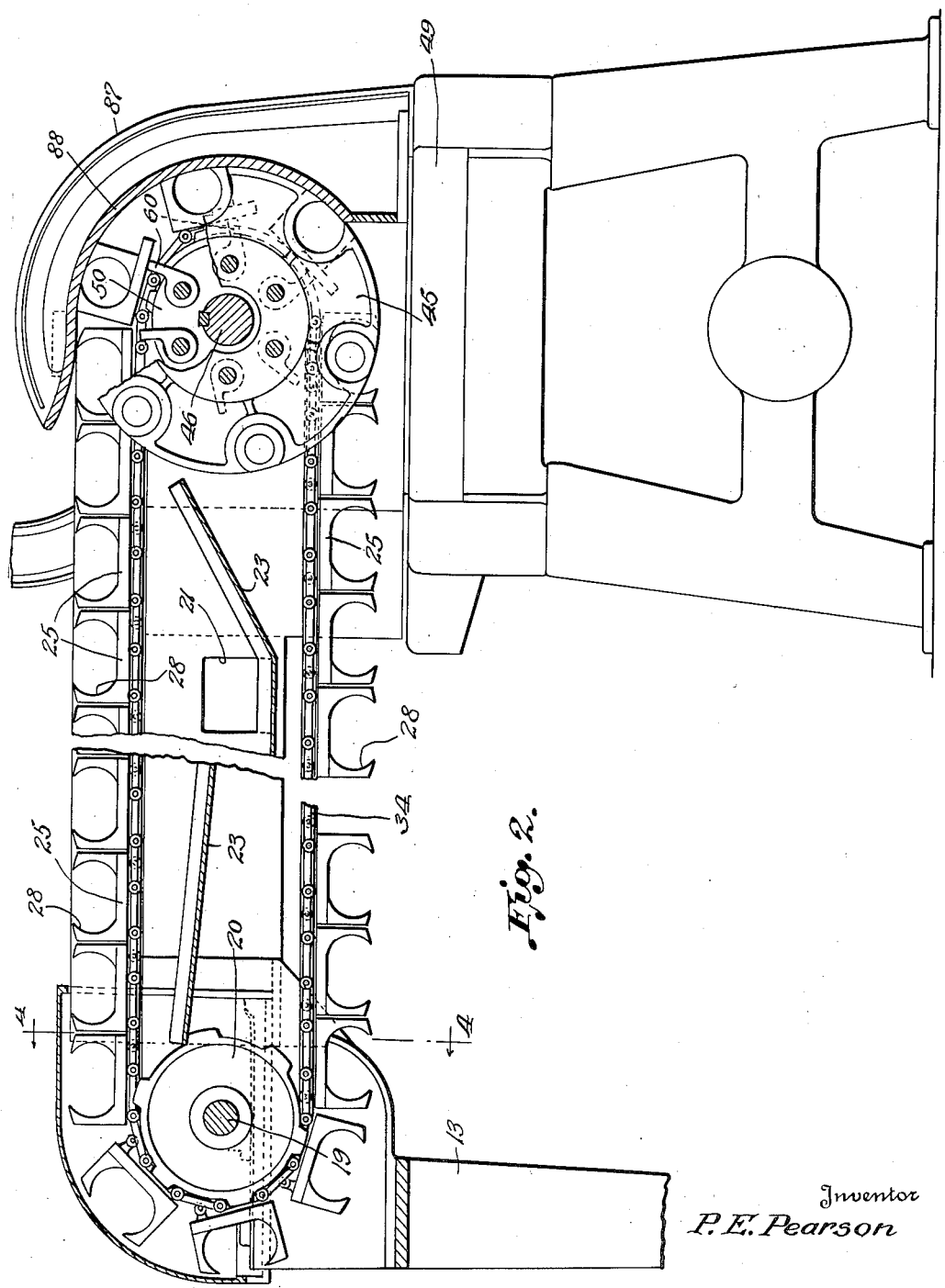
Fig. 2 is a vertical longitudinal section on the line 2—2 of Fig. 1.

The area within the table between the side wall 16, 16 has a drip pan 23 and one side wall is open as at 21 opposite the bottom of the drip pan to form a clean-out opening (Fig. 2).

An endless conveyor 24 extends centrally of the table 11 and is supported upon the upper tracks 17, 17 and lower tracks 18, 18. The endless conveyor is of the link type having spaced rollers between adjacent links.

The conveyor also includes a series of mold units 25. Each mold unit 25 consists of a bottom 26 and an integral upstanding end or abutment 27. The end 27 has a curved inner wall 28 to confine charges of fish during compression.

The bottom 26 of the unit 25 is bifurcated to provide two side portions 26a and 26b extending rearwardly from the front edge to a short distance in front of the base of the upstanding end 27, and an intervening space 30. This structure is denominated a fixed mold section. The side portions form a pair of internally grooved tracks between which a movable mold section slides in the space 30 to rest against the base at the rear of the side portions.

Projecting downwardly from the base 26 are opposite spaced flanges 31. These flanges form links in the chain of the endless conveyor. Each flange has a pair of spaced pins 32 on which rollers 33 are mounted loosely outside the flange 31. Spacing chain links 34, 34 are loosely held on the stub shafts 32 outside the rollers 33. The rollers 33, it will be understood, support the mold units 25 during travel over the tracks 17 and 18. Suitable links 35 connect the stub shafts 32 of adjacent mold units 25. These links 35 connect the ends of the flanges 31 beneath the end 27 of the fixed mold section 25 and the adjacent end of the flange under the open end of the next mold unit. By this arrangement there is one mold unit for each conveyor link 34.

The open portion 30 of the base 26 carries a movable mold section 36 having ribs which are seated in the grooved tracks of the base 26.

The free end of the mold section 36 has an upwardly projecting end or abutment 38 inwardly curved as shown in Fig. 2 opposite the curved end 28 of the fixed mold section. The end 38 closely overlies the base 26.

A cover plate 39 is suitably bolted over the ends of the spaced portions 26a and 26b of the base 26 and thus serves to limit the open movement or retraction of the movable mold section 36. This extent of open movement is indicated at the left of Fig. 7 where the end 38 overlies the end plate 39, and is closely adjacent the fixed end 27 of the fixed mold section.

Figure 6:
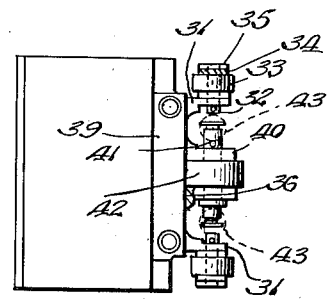
Fig. 6 is a front elevation of the same.

The movable mold section 36 has a pair of depending brackets 40 spaced apart as shown in Fig. 6. A shaft 41 is carried between the brackets 40 and serves as a journal for a loose roller 42.

Means is provided to hold the movable mold section 36 in its open position. This means is shown in Fig. 7 as a helical tension spring 43. One end of the spring is attached to the shaft 41. The opposite end is attached to a pin 44 in the next preceding mold unit. This pin 44 is riveted to link 34. The movable mold sections 36 are thus under constant tension and normally in open position spaced from the opposite end of the fixed mold sections.

The filling machine 12 has a rotary filling turret 45. This is mounted upon a transverse shaft 46 which is journaled in bearings 47 and 48 on a base 49. The general features and operation of the shaft 46 and the filling turret 45 are the same as those used in the above mentioned patents to Nicholson and Dodge. The differences are primarily the means for supporting the endless conveyor 24. For this purpose the shaft 46 has a pair of spaced sprockets 50, 50 similar to the sprockets 20 already described. The sprockets have teeth 51 suitable to fill the space between adjacent rollers of the conveyor. Exteriorly of the sprockets 50 the shaft 46 carries a pair of plates 52, 52. Between the sprockets there is a hub 53 fixed on shaft 46.

Spiders 54, 54 are mounted at spaced distances along the shaft 46. A series of rock shafts 55 are loosely journaled in the spiders 54, 54 and extend through the nearer plate 52, sprocket 50 and hub 53.

At their outer ends the rock shafts have offset arms 56 terminating in rollers 57. The rollers 57, in turn, travel within a permanently mounted cam 58. The inner ends of the rock shafts 55 have fixed collars 59 with radial bars 60.

The bars 60 thru the rotation of the shafts 55 engage the rollers 40 in front to cause the movable mold sections 36 to close.

Fig. 7 shows in detail the form of the cam 58 and its relation to the endless conveyor 24 and the mold units as the latter travel around the sprockets 50, 50. Commencing at the point a, (Fig. 7) the roller 42 strikes the bar 60 while the latter is held by roller 57 in a substantially radial position.

Due to the particular form of the cam track 58 and during the rotation of the shaft 46 from the point "a" to the position "b," the bar 60 is retarded relative to the forward movement of the conveyor. In this way the roller 42 and the movable mold section 36 are held back overcoming the tension of spring 43 and the mold sections 27, 36 are brought into the position of closest proximity as shown in Fig. 7. The continued movement from "b" to "c" retains the mold unit in a compressed or compact form for a period long enough to enable the charge to be transferred to an empty can. From the point "c" to "d" the cam action is such as to remove pressure of bar 60 from the roller 42 and thus permit the movable mold section to slide away from the fixed mold wall and restore the mold to the open filling position indicated in the lower rim of the conveyor. During the rotation of the shaft from "d" to "e," the bar 60 is restored to its substantially radial position conforming to that which it occupies at the point "a" where it again comes into retracting position.

Figure 3:
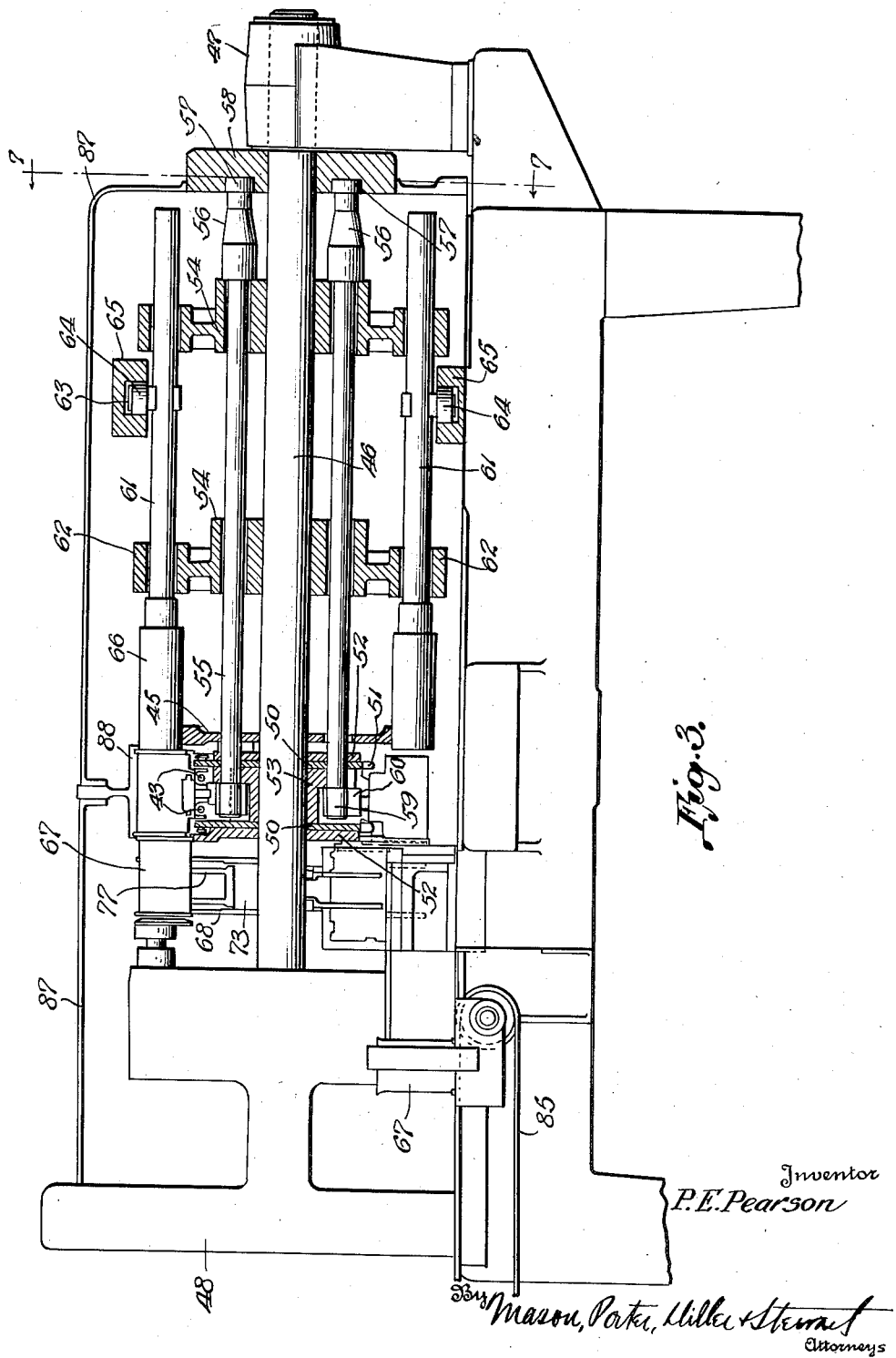
Fig. 3 is a transverse vertical section of the molding and filling means taken on the line 3—3 of Fig. 1.

The spiders 54, 54 (Fig. 3) carry a series of shafts 61, 61 outwardly of the shafts 55. Shafts 61 are keyed for sliding movement in bearings 62 of the spiders 54. Each shaft 61 has fastened on it a lateral stud 63 which forms a journal for a loose roller 64.

The rollers 64 move in a cam track 65.

Figure 1:
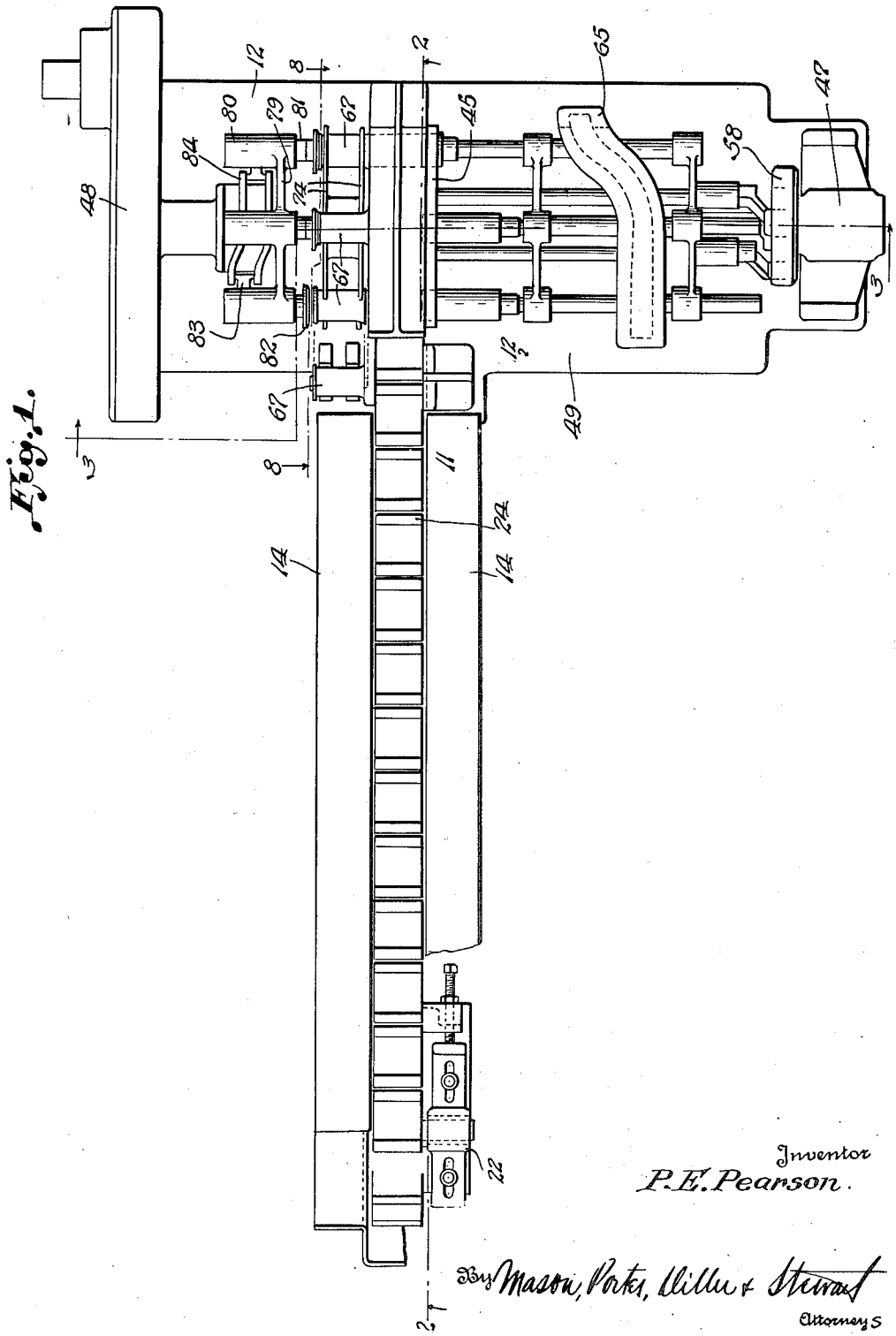
Fig. 1 is a top plan view of the complete machine.

As shown in Fig. 1, the cam 65 has an advanced position substantially at the point where the mold units are carried in compressed position around the sprocket wheels 50, 50. Accordingly, the shafts 61 are thus advanced toward the closed mold units.

Each shaft 61 carries at its forward point an enlarged plunger 66 which conforms to the cross section of a closed mold and is adapted to traverse the latter. The extent of the cam 65 is such that the plunger 66 forces the contents of the mold units laterally out of the latter and into cans 67 for receiving the material. The apparatus for carrying out this operation is, in general, similar to that disclosed in the above mentioned Nicholson patent.

Cans 67 are presented for filling in a can feeder indicated in general by 68. The cans are delivered by gravity through a chute 69 suitably mounted on a frame as indicated at 70 in Fig. 8.

The can feeder has a housing 71 generally circular in cross section with a removable door 72. The shaft 46 projects axially through the housing 71. Within the housing the shaft carries a drum 73 formed of two spaced spiders 74. These spiders have aligned pockets 75 suitable to receive cans 67 from the chute 69 and carry them around the casing 71 to the discharge chute 76 (see Fig. 8). Between the spiders 74, 74 there is a pair of fixed ejector plates 77. These plates serve as supports for the cans during the rotation of the drum until the cans reach the discharge point at which time the sloping portions 78 of the plates 77 positively eject the cans and deliver them to the chute 76.

Back of the drum 73, shaft 46 carries a turret 79. This turret has a series of bearings 80 extending longitudinally of the turret. Each bearing 80 has a freely slidable shaft 81 with a face plate 82. This face plate is positioned and proportioned to fit against the closed end of the empty can.

The inner end of each shaft 81 carries a roller 83 which travels in a cam track 84 suitably mounted upon the bearing 48. The cam 84 has an advanced portion opposite the advanced portion of the cam track 65 so that the plate 82 will be advanced against the bottom of the empty can and supporting it during the ejecting operation of the plunger 66.

Here again the operation is similar to that disclosed in the earlier Nicholson patent.

From the inclined chute 76 the filled cans are tilted into upright position and delivered to an endless belt 85 by which they are removed for sealing. Suitable housing 86 overlies the endless belt 85 and forms a passageway for the filled cans.

The mechanism for emptying the mold units into the cans is suitably protected by a housing 87 while the mechanism for compressing the mold units is protected by a close circular shield 88.

To summarize, the arrangement above described in detail provides an extended conveyer run at which small fish or like articles may be arranged in pockets on the conveyer. The pockets are held normally open or extended to receive appropriate numbers of the fish arranged, if necessary, in alternation so that the bulk will be uniform or equalized at each end of the pockets. The conveyor pockets are led to the sprocket wheels where means are provided to contact one (front) wall of each pocket compressing the mass of fish into a cylindrical or other desired form. This will conform to the cross-section of the cans in which the pockets are to be emptied.

The cans are brought into position opposite the contacted pockets and the latter emptied into the cans by means common to the industry.

The specific description and illustration have been given by way of example only. Many minor variations in form, proposition and materials will suggest themselves to those skilled in the art as being within the scope of the appended claims.

What I claim is:

1. Apparatus for packing small fish in cans, comprising an endless chain conveyor having a plurality of connected mold units, each unit comprising a main jaw portion and a contractible jaw portion, springs for yieldably holding the said jaw portions separated, a rotatable turret having charge-packing plungers, a sprocket on the turret for the conveyor, rocking means carried on said sprocket for contracting the jaw portions of the mold units against the pull of the springs, means for feeding empty cans in axial alignment with the mold units and plungers, and means for actuating the plungers to transfer the compressed mold charges to the cans.

2. Apparatus for packing small fish in cans, comprising an endless chain conveyor having a plurality of link connected mold units, each unit comprising a main jaw portion and a second jaw portion carried by said main portion for slidable movement toward and from the main portion, springs for yieldably holding the said jaw portions separated, a rotatable turret having charge packing plungers, a sprocket on the turret for the conveyor, levers on the sprocket for contracting the jaw portions of the mold units, a cam for rocking the levers as the sprocket rotates, means for feeding empty cans in axial alignment with the mold units and plungers, and means for actuating the plungers to transfer the compressed mold charges to the cans.

3. Apparatus for packing small fish in cans, comprising an endless chain conveyor having a plurality of link connected mold units, each unit comprising a main jaw portion and a second jaw portion carried by said main portion for slidable movement toward and from the main portion, a roller on the jaw portion, a spring connecting each slidable jaw portion with the main portion of the adjacent mold unit, a rotatable turret having charge packing plungers, a sprocket on the turret for the conveyor, levers on the sprocket for engaging the rollers on the jaw portions against the pull of said springs, a cam for rocking the levers as the sprocket rotates, means for feeding empty cans in axial alignment with the mold units and plungers, and means for actuating the plungers to transfer the compressed mold charges to the cans.

4. Apparatus for packing small fish in cans, comprising two parallel spaced link chains, a series of mold units each of which has a pair of depending spaced flanges constituting links in said chains, slidable jaw portions for the mold units, springs to yieldably hold said jaw portions open, a roller on each jaw portion between the flanges, a rotatable turret having charge packing plungers, a two wheel sprocket on the turret for engaging the link chains, levers on the sprocket between the wheels thereof, to close the jaw portion, a cam for rocking the levers as the sprocket rotates, means for feeding empty cans in axial alignment with the mold units and plungers, and means for actuating the plungers to transfer the mold charges to the cans.

5. Apparatus for packing small fish in cans, comprising a rotatable turret having charge packing plungers, means for feeding empty cans in axial alignment with the plungers, a drive sprocket carried by the turret between the plungers and the can feeding means, a filling table laterally disposed from the sprocket, an idle sprocket journaled on the table, an endless conveyor carried by the sprockets, mold units on the conveyor said units having contractible jaws, and rocking levers carried by the turret to the contract the jaws as the units pass around the first named sprocket and means on the turret to transfer the charges from the closed mold units to the empty cans.

6. Apparatus for packing small fish in cans, comprising a rotatable turret having charge packing plungers, means for feeding empty cans in axial alignment with the plungers, a drive sprocket carried by the turret between the plungers and the can feeding means, a filling table laterally disposed from the sprocket, an idle sprocket journaled on the table, tracks between the sprockets centrally of the table, an endless conveyor carried over the tracks between the sprockets, mold units on the conveyor, said units having normally separated jaws, and rocking levers carried by the turret to contract the jaws as the units pass around the drive sprocket and means on the turret to transfer the charges from the closed units to the empty cans.

7. A fish molding unit for a packing machine comprising a mold section having a fixed end abutment and a base with an open bottom, the base being provided with spaced portions defining parallel tracks on opposite sides of the open bottom, a second mold section having a bottom portion slidably carried on said tracks, an abutment on the outer end of said bottom portion of the slidable mold section and closely overlying the base of the first-mentioned mold section, and a cover plate across the end of the base of the first-named mold section.

PAUL E. PEARSON.

REFERENCES CITED

The following references are of record in the file of this patent:

UNITED STATES PATENTS

| Number | Name | Date |
|---|---|---|
| 1,891,830 | Nicholson | Dec. 20, 1932 |
| 1,891,870 | Dodge | Dec. 20, 1932 |
| 2,180,349 | De Back | Nov. 21, 1939 |
| 2,244,540 | Lenzke | June 3, 1941 |
| 2,338,471 | Vanerstrom | Jan. 4, 1944 |

FOREIGN PATENTS

| Number | Country | Date |
|---|---|---|
| 467,512 | France | June 13, 1914 |